Jan. 8, 1929.                    1,698,025
J. S. SAUNDERS
REFLECTOR FOR MOTOR VEHICLE LAMPS
Filed Nov. 30, 1926

INVENTOR
J.S. Saunders
BY
ATTORNEY

Patented Jan. 8, 1929.

1,698,025

UNITED STATES PATENT OFFICE.

JOHN SAMUEL SAUNDERS, OF CHRISTCHURCH, ENGLAND.

REFLECTOR FOR MOTOR-VEHICLE LAMPS.

Application filed November 30, 1926, Serial No. 151,778, and in Great Britain December 4, 1925.

This invention relates to an improved reflector for lamps particularly though not necessarily exclusively adapted to lamps for motor vehicles.

In lamps commonly used on motor vehicles a paraboloidal reflector is used and a long concentrated beam of light is projected which leaves a comparatively dark border on each side of the vehicle, whereby, in the case of road vehicles, the side of the roads and turnings are much obscured. Also there is very little illumination in front of and close to the vehicle. Further, objectionable dazzle is occasioned to on-coming traffic.

The principal object of the present invention is to provide a lamp which gives good distant illumination but which is free from dazzle.

Another object is to provide a lamp having a reflector which directs light rays to the sides of the lamp thus clearly illuminating the sides of the road when carried upon a road vehicle.

A further object is to provide a lamp having a reflector which gives clear illumination immediately below the lamp, the rays striking the base of the reflector being reflected downwardly directly onto the road.

A still further object is to provide a lamp which gives more efficient lighting in the case of fogs.

These and other objects of the invention will be apparent as the specification proceeds.

Figure 1:
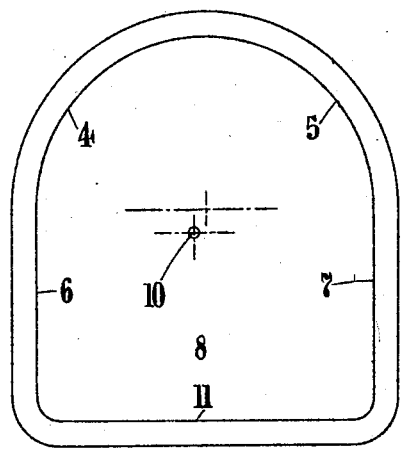
Figure 2:
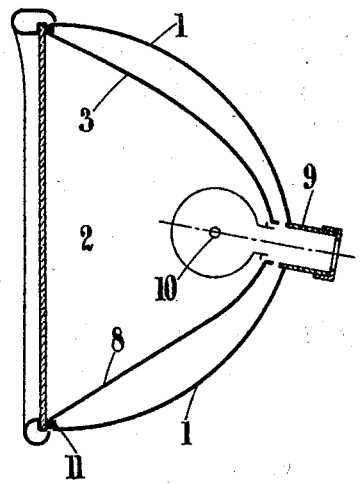
Figure 3:
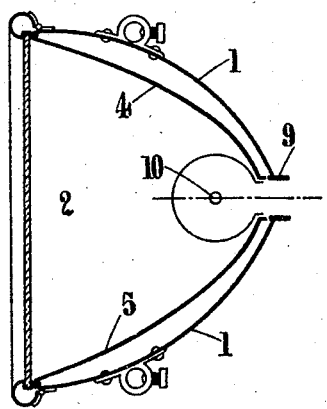

The accompanying drawings show a preferred construction of a lamp and reflector according to this invention, Figure 1 shows in front elevation, Figure 2 in side sectional elevation and Figure 3 in sectional plan view, a lamp for the head lights of a motor vehicle.

In the lamp casing 1, is housed the reflector 2 comprising a paraboloidal reflecting surface 3 and upper side paraboloidal surfaces 4 and 5 merging into substantially vertical parabolic sides 6 and 7, and a flat inclined base reflecting surface 8 tangential to the rear paraboloidal surface of the reflector and uniting with the sides 6 and 7 by curved surfaces. The surfaces 4 and 5 and 6 and 7 may be developments of parabolas of different constants and in the case illustrated the parts 4 and 6 have a wider splay than parts 5 and 7. The lamp holder 9 is inserted so that the source of light 10 comes preferably mid-way between the surfaces 4 and 5 and the holder may be tilted as shown in Figure 2 so as to avoid a dazzle point which may be caused on any parabolic surface below the lamp.

Light rays from the lamp are reflected in a beam from the upper paraboloidal surfaces 3, 4 and 5 and also in flat rays spread in a fan formation from the reflecting surfaces 6 and 7.

The angularity of the inclined base 8, is such as to prevent light rays from leaving the reflector in an upward (and therefore dazzling) direction, but is so chosen and the lamp so positioned as to cause days to issue substantially horizontally and the straight front lower edge 11 of the reflector permits downward rays to reach the ground very close to the vehicle.

For side lights the lighting source may be placed higher up in relation to the reflector than in the case of head lamps.

The lamps would be set at the best angle as found by experiment, i. e. they may be turned slightly to one or other side or be tilted upwards or downwards.

I claim:—

A reflector for lamps comprising an upper substantially paraboloidal reflecting surface, side reflecting surfaces each comprising an upper substantially paraboloidal surface and a lower vertical substantially parabolic surface, the splay of such parts on one side of the lamp being different from that on the other side and such sides merge by slightly curved surfaces into the plane base tangential to the rear of the reflector and inclined downwards therefrom to the front edge.

In witness whereof I affix my signature.

JOHN SAMUEL SAUNDERS.